No. 734,982. PATENTED JULY 28, 1903.
J. D. SMITH.
ADVERTISING DEVICE.
APPLICATION FILED SEPT. 27, 1902.
NO MODEL. 2 SHEETS—SHEET 1.
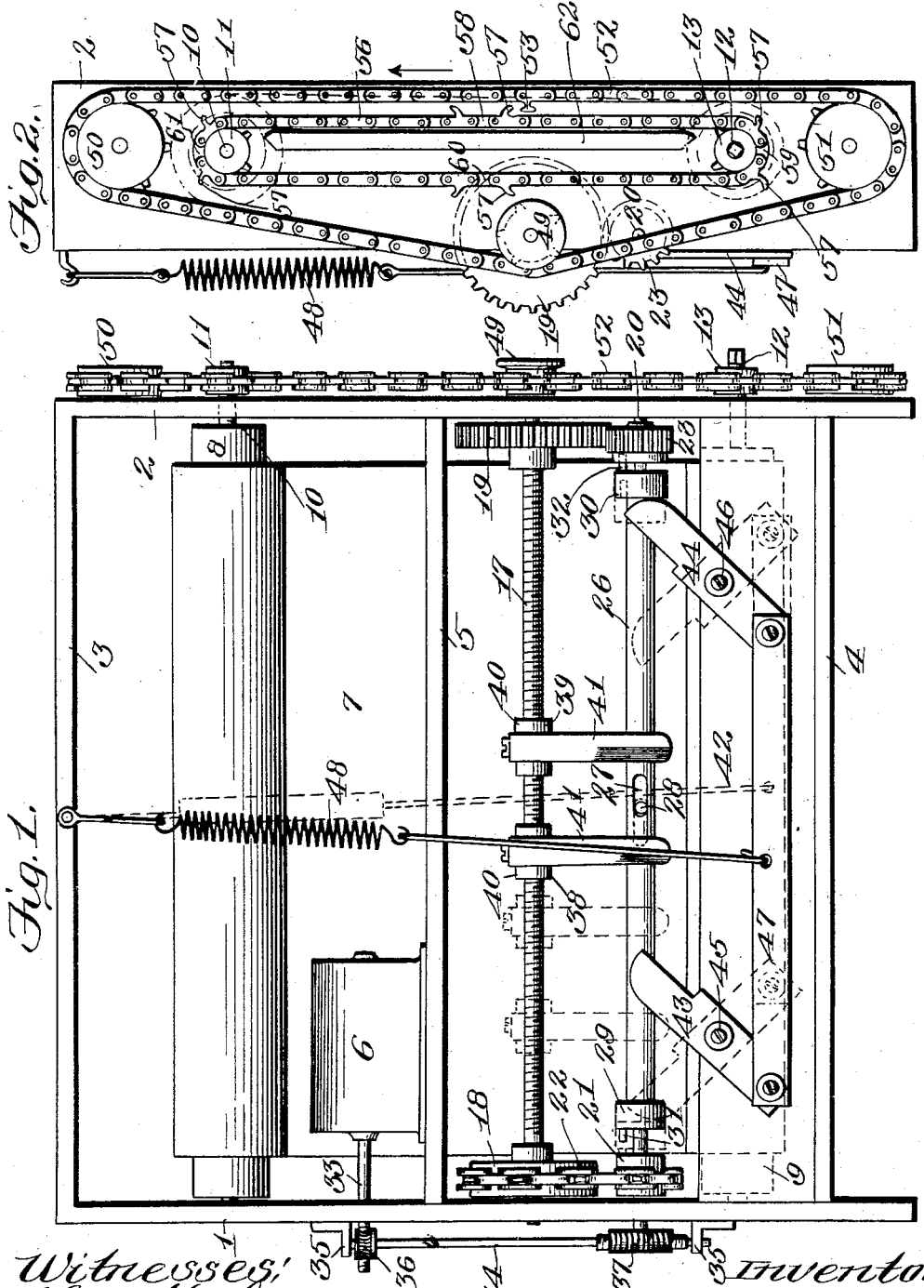

No. 734,982. PATENTED JULY 28, 1903.
J. D. SMITH.
ADVERTISING DEVICE.
APPLICATION FILED SEPT. 27, 1902.
NO MODEL. 2 SHEETS—SHEET 2.
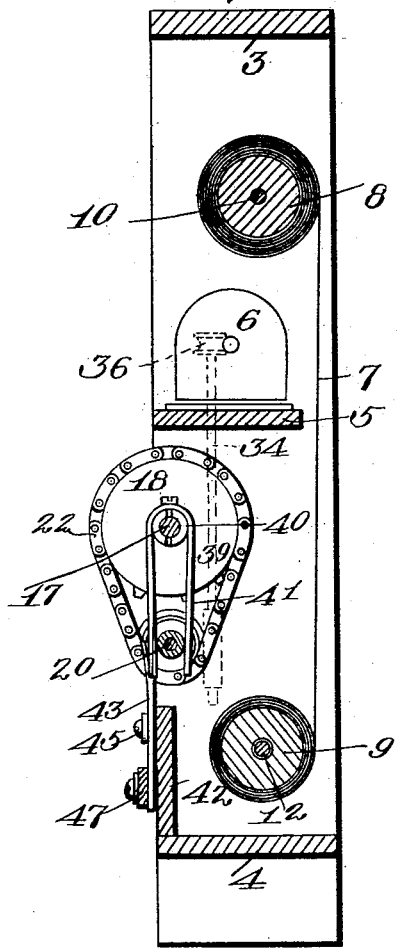
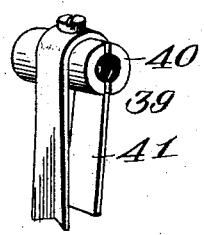
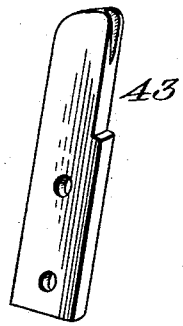
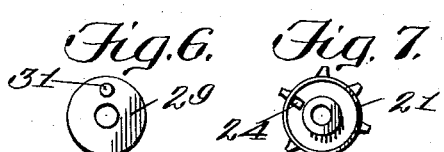
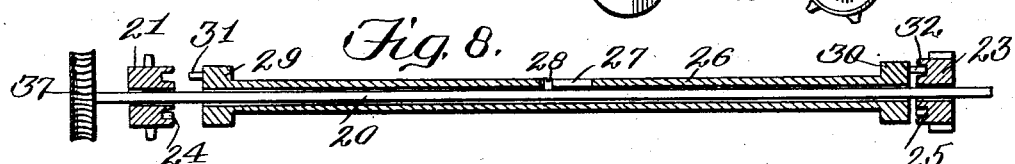
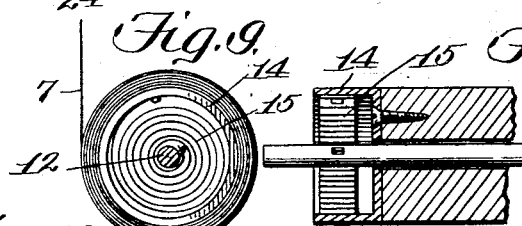
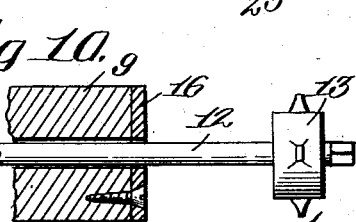
Witnesses
C. D. Kesler
W. B. Keefer
Inventor
John D. Smith
By James L. Norris
Atty.
THE NORRIS PETERS CO., PHOTO-LITHO., WASHINGTON, D. C.

No. 734,982. Patented July 28, 1903.

UNITED STATES PATENT OFFICE.

JOHN D. SMITH, OF BONHAM, TEXAS.

ADVERTISING DEVICE.

SPECIFICATION forming part of Letters Patent No. 734,982, dated July 28, 1903.

Application filed September 27, 1902. Serial No. 125,080. (No model.)

*To all whom it may concern:*

Be it known that I, JOHN D. SMITH, a citizen of the United States, residing at Bonham, in the county of Fannin and State of Texas, have invented new and useful Improvements in Advertising Devices, of which the following is a specification.

My invention relates to certain new and useful improvements in advertising devices of the kind employing a traveling web or sheet, and has for its general object to provide a simple and compact device of this character and one that may be economically manufactured.

Specific objects of the invention are to provide an improved means for actuating the advertising web or sheet, to provide means for automatically taking up slack in the said web or sheet in the movement in either direction thereof, to provide means for automatically reversing the direction of movement of the web, and to provide improved means for automatically causing the movement of the advertising-sheet to cease at predetermined intervals in order to display the advertisements thereon.

In order that my invention may be fully understood, I have illustrated the same in the accompanying drawings, wherein—

Figure 1 is a rear elevation of the complete device except for an inclosing casing, which for the purpose of better illustration has been omitted. Fig. 2 is an end elevation looking toward the left of Fig. 1. Fig. 3 is a central vertical section of Fig. 1. Fig. 4 is a detail view of one of the followers. Fig. 5 is a detail view of one of the reversing-arms. Fig. 6 is a face view of the clutch member at one end of the sliding sleeve. Fig. 7 is a similar view of the coöperating sprocket-wheel. Fig. 8 is a view in elevation of the drive-shaft with the sleeve and clutch members mounted thereon shown in section. Fig. 9 is an end view of the roller containing the compensating-spring, and Fig. 10 is a broken sectional view of said roller with its shaft and sprocket-wheel in elevation.

Referring now to the drawings, the frame of the device is shown to consist of uprights 1 2, forming the sides of the frame, which uprights are connected at top and bottom by cross-pieces 3 4. A second cross-piece 5, located about midway of the uprights, supports a small electric motor 6 for moving the advertising-sheet 7 by means of mechanism hereinafter described. Said advertising-sheet has its opposite ends secured to rollers 8 9, located, respectively, near the top and bottom of the frame. The upper roller 8 is fixed on a shaft 10, which is journaled at opposite ends in the uprights 1 2 and at one end is provided with a fixed sprocket-wheel 11. The roller 9 is loosely mounted upon a shaft 12, which also is journaled at opposite ends in the uprights 1 2 and is provided at one end with a fixed sprocket-wheel 13 in the same vertical plane as the sprocket-wheel 11. Secured on one end of the roller 9 is a cup-shaped socket 14, through which the shaft 12 passes. Within this cup-shaped socket is located a coiled-wire spring 15, one end of which is secured to the shaft and the other end to the socket 14. On the other end of this roller is secured a simple face-plate 16, having an aperture through which the shaft 12 passes and by means of which the roller at this end is journaled on the said shaft. At the rear of the frame and beneath the cross-piece 5 I journal at its opposite ends in the uprights 1 2 a shaft 17, which is screw-threaded throughout its length. At one end this shaft is provided with a fixed sprocket-wheel 18 and at its opposite end with a fixed gear-wheel 19. Below the shaft 17 and in the same vertical plane therewith is a shaft 20, journaled at its opposite ends in the uprights and provided with a loose sprocket-wheel 21 in the same plane with but much smaller than the sprocket-wheel 18, with which it is connected by means of a sprocket-chain 22, and with a spur-gear 23 in mesh with the gear-wheel 19. Extending inward from the sprocket-wheel 21 is a pin 24, and extending inward from the spur-gear 23 is a pin 25.

Slidably mounted on the shaft 20 is a long sleeve 26, which is provided with a longitudinal slot 27 to receive the head of a screw 28, screwed in the shaft 20, whereby said sleeve may have a longitudinal movement on the said shaft, but is compelled to rotate therewith. On each end of the sleeve 26 is a fixed collar 29 30, projecting from the outer end of each of which is a pin 31 32, which pins are adapted to engage with one or the other of the pins 24 25 in the manner of a clutch by moving the sleeve 26 over the shaft 20 in one direction or the other. According as one or the other of these engagements is made the direction of rotation of the screw-threaded shaft 17 is determined.

The shaft 20 is the driving-shaft and receives its motion from the motor-shaft 33 through the medium of a vertical shaft 34, mounted in bearings 35 on the upright 1 and having at its upper end a worm-wheel 36 in gear with a worm on the motor-shaft and at its lower end a worm in gear with a worm-wheel 37 on the end of the shaft 20.

The mechanism for automatically effecting a reversal of movement of the shaft 17 will now be described.

Mounted upon the shaft 17 are two travelers 38 39, each of which comprises a cylindrical head 40 in screw-threaded engagement with the shaft, and a yoke 41, the arms of which straddle the sleeve 26, whereby the travelers are prevented from rotating with the shaft 17. Pivotally mounted on a cross-piece 42 at the bottom and rear of the frame are two arms 43 44, their pivots 45 46 being located about centrally of their length. These arms are vertically disposed, and their lower ends are connected by a cross-bar 47. The upper end portions of said arms are in close proximity to the sleeve 26 and project slightly above the same. The arms 43 44 are located at such distance apart that when thrown to one side or the other their upper ends will engage with the collar 29 or the collar 30, as the case may be, to move the sleeve 26 into engagement with one or the other of the clutch-pins at the end of the shaft 20. A coiled-wire spring 48 is secured at one end to the cross-bar 47 centrally of the latter and at its opposite end to the upper cross-piece 3 of the frame. The arms 43 44 are thrown outward by the engagement of one arm of each yoke 41 with one or the other as the travelers are moved along by the rotation of the shaft 17, the arms 43 44 extending into the path of movement of the outer arm of each of said travelers. Thus if the shaft 17 be turning in a direction to cause the travelers 38 39 to move toward the left (in Fig. 1) the traveler 38 will in time engage the upper end of arm 43 and gradually press it outward until its pivotal connection with the cross-bar 47 passes beyond the pivotal connection 45, when the action of the spring 48 will draw the said cross-bar upward, and thereby suddenly throw the arm 43 outward against the collar 29, causing the sleeve 26 to be moved to the left and the clutch-pins at that end of the device to be brought into engagement. This will cause a reversal in the direction of rotation of the shaft 17, and the travelers will now move toward the right until the traveler 39 has caused the arm 44 to be pressed outward far enough to allow the spring 48 to throw said arm against the collar 30, which will move the sleeve 26 to the right and cause its clutch-pin to be engaged by the clutch-pin of the spur-gear 23, which will operate to cause a reversal in the direction of movement of the shaft 17. In this latter position of the parts, which is indicated by full lines, the shaft 17 is driven from the spur-gear 23 through the medium of the gear-wheel 19. In the position of the parts indicated by dotted lines the shaft 17 is driven in the reverse direction from the sprocket-wheel 21 through the medium of the sprocket-chain 22 and the sprocket-wheel 18. The advertising-sheet 7 is given an intermittent motion from the shaft 17 through the following means: On the end of the shaft 17 which extends through the upright 2 is a fixed sprocket-wheel 49, while at each end of said upright is an idler-pulley 50 51. A sprocket-chain 52 passes over the sprocket-wheel 49, by which it is driven, and over said idler-pulleys. One of the links of this chain has at one end an inward-extending lug 53. The shafts of the rollers 8 and 9 also extend through the upright 2 and are each provided on their outer ends with a sprocket-wheel 11 13. Over these sprocket-wheels passes a sprocket-chain 56. Four pairs of links in this sprocket-chain are provided with curved fingers 57, said fingers projecting outwardly from the outer end of each link of a pair. These pairs of links, which are indicated, respectively, by the numerals 58, 59, 60, and 61, are located at equal distances apart and are adapted to have one or the other of their fingers 57 engaged by the lug 53 to move the advertising-sheet.

The operation is as follows: The motor 6 being started, the threaded shaft 17 will be rotated in one direction or the other, according as it is driven by the sprocket-chain 22 or the spur-gear 23. The rotation of this shaft causes the sprocket-chain 52 to travel over the loose pulleys 50 and 51 through the medium of the sprocket-wheel 49. Assuming that the chain 52 is traveling in the direction of the arrow in Fig. 2, the lug 53 will engage the lower arm 57 of the link-section 58 and cause the sprocket-chain 56 to travel with it, thus rotating the rollers 8 9 and causing the advertising-sheet 7 to be wound on the roller 8 and unwound from the roller 9. This continues until the two links 58 have passed onto the sprocket-wheel 11, when the arm 57 will be drawn out of engagement with the lug 53, and consequently the sprocket-chain 56 will cease to travel, permitting the advertising-sheet to remain stationary. The advertisements on said advertising-sheet are located at such intervals thereon that this stoppage of the sheet will occur at a time when an advertisement thereon will have been carried to the proper position to be displayed at the front of the device. The advertising-sheet will remain stationary while the lug 53 travels over the pulley 50, the sprocket-wheel 49, and the pulley 51 and passes up into engagement with the lower arm 57 of the link-section 59, which in the previous movement of the sprocket-chain 56 will have been brought to the position formerly occupied by the link-section 58, after which the sprocket-chain 56 will be carried along by the lug 43 until the link-section 59 has passed onto the sprocket-wheel 11. This movement of the sprocket-chain 56 will thus occur, as will be readily understood, in each complete traverse of the lug 53 over the path of movement of the sprocket-chain 52, said lug engaging in succession the arms on the link-sections 58, 59, 60, and 61 and with each engagement imparting a quarter-rotation to the sprocket-chain 56 to bring a fresh advertisement into place. Sufficient time elapses between each movement of the sprocket-chain 56 to permit the advertisement displayed to be read or examined.

In order to insure the proper engagement of the lug 53 with the several arms 57, I provide a rail 62 on the outside of the upright 2 and within the sprocket-chain 56. Said rail extends nearly the entire distance between the sprocket-wheels 11 13 and is so disposed as to cause the sprocket-chain 56 to travel in contact with its inner side, or the side opposed to the lug 53, when it is in the act of engaging one of the arms 57, so that on this side the said sprocket-chain is compelled to travel in a true vertical path and is prevented from yielding inwardly when the lug 53 engages one of the arms 57. It will be understood that in the travel of the sprocket-chain 52 in the reverse direction to that described the lug 53 will engage with the upper arm 57 of each link-section in turn, and the disengagement will occur when the link-section passes onto the sprocket-wheel 13. Thus in the position of the parts shown in Fig. 2 if the direction of rotation of sprocket-chain 52 were reversed the lug 53 would travel around pulley 51, sprocket-wheel 49, and pulley 50, and then engage the upper arm 57 of link-section 58. The manner of and mechanism for reversing the direction of rotation of shaft 17 have already been described, and this reversal occurs when the requisite length of the advertising-sheet has been wound on one or the other roller 8 9. The frequency with which the movement of the sheet is reversed is determined by adjusting the travelers 38 39 on the shaft 17—that is to say, the nearer together these travelers are placed the longer the shaft 17 will rotate in one direction, and vice versa.

In assembling the rollers 8 9 in the device the shaft 12 is first given a few turns to partly wind up the spring 15, after which the sprocket-chain 56 is placed about the sprocket-wheels 11 13, so that said shafts can now only move in unison. It being assumed that the sheet is wound on the roller 9, said roller will of course present a greater circumference than the roller 8, and ordinarily as the rollers were revolved to unwind from roller 9 and wind on roller 8 more of the sheet would be unwound from roller 9 than would be wound upon roller 8, and consequently the sheet would sag between the rollers. With my improvement, however, this slack will be taken up by the gradual unwinding of the spring 15, which will cause the roller 9 to revolve in a reverse direction to that of its shaft. This will continue until the diameters of the two rollers are equal, at which time the spring will have a moderate tension. In the further movement of the parts in the same directions the roller 8 will gradually increase in diameter and will tend to wind up a greater length of sheet than without my improvement would be unwound from the roller 9. As it is, however, the roller 9 may turn on its shaft 12 to give off this extra amount, which results, however, in winding up the spring 15. When the direction of rotation of the rollers 8 9 is reversed after the sheet has been wound on the roller said roller 8 will tend to give off a greater amount of the sheet than would be wound upon the roller 9; but as the spring 15 has been wound up it will now unwind and thus rotate the roller 9 sufficiently to take up the slack, and this will continue until the diameters of the two rollers are equal and the power of the spring is again moderate. The roller 9 now begins to increase in diameter and to require more of the sheet than the roller 8 can unwind, and consequently the only result can be to again wind up the spring 15 to a greater or less extent. Thus the spring 15 is alternately wound and unwound, being wound in one direction of movement by the excess of movement of the shaft 12 over the roller 9 and in the opposite direction by the excess of movement of the roller 9 over the shaft 12. In the complete movement of the sheet in either direction—that is to say, in winding it from one roller onto the other—the spring 15 will first be unwound and then wound up again, and this will continue as long as the device is kept in operation. Thus I provide for automatically taking up the slack in the sheet in a simple but reliable and effective manner.

It will be understood that I contemplate inclosing this device in the usual or any preferred manner in a casing having a suitable view-opening. As I intend the device primarily for use in street-railway cars, it is within the purview of my invention to have the device built as a part of the car construction—that is, to utilize the inner ornamental framework of the car as the casing.

Having thus fully described my invention, what I claim as new is—

1. In a device of the character described, the combination with two spaced rollers having the ends of an advertising-sheet secured thereto, of driving mechanism comprising a threaded shaft and clutch mechanism, means actuated by said driving mechanism for imparting an intermittent rotation to said rollers, compensating mechanism carried by one of said rollers for regulating the feed of the sheet and means adapted to travel on said shaft and to operate said clutch mechanism for automatically reversing the direction of rotation of said rollers.

2. In a device of the character described, the combination with two spaced rollers having the ends of an advertising-sheet secured thereto, of driving mechanism comprising a threaded shaft and clutch mechanism, means actuated by said driving mechanism for imparting an intermittent rotation to said rollers, compensating mechanism carried by one of said rollers for regulating the feed of the sheet and travelers adjustably mounted on said shaft and adapted to operate said clutch mechanism for automatically reversing the direction of rotation of said rollers.

3. In a device of the character described, the combination with two spaced rollers having the ends of an advertising-sheet secured thereto, of driving mechanism comprising a threaded shaft and clutch mechanism, pivotally-mounted spring-controlled impact-arms for operating said clutch mechanism and a traveler mounted on said shaft and adapted to engage one or the other of said impact-arms to move it to a position where its spring will operate to throw it into contact with the clutch and thereby operate the latter.

4. In a device of the character described, the combination with two spaced rollers having the ends of an advertising-sheet secured thereto, of driving mechanism comprising a threaded shaft and clutch mechanism, and said clutch mechanism comprising a longitudinally-movable sleeve having at its ends stops, a pair of pivotally-mounted and pivotally-connected spring-controlled impact-arms for operating said clutch mechanism and a pair of travelers adjustably mounted on said shaft and adapted in the movement of the latter to engage one or the other of said impact-arms and move the same to a position where its spring will operate to throw it into engagement with the stop on one end of said sleeve to operate the clutch mechanism and simultaneously withdraw the other of said arms out of contact with the stop at the other end of said sleeve.

5. In a device of the character described, the combination with two spaced rollers having the ends of an advertising-sheet secured thereto and provided at corresponding ends with a sprocket-wheel, of a sprocket-chain mounted on said wheels and provided at equidistant points with arms, driving mechanism including a sprocket-chain mounted to travel at one side in proximity to one side of said first-named sprocket-chain, and a lug carried by said second-named sprocket-chain and adapted to engage in succession the said arms, whereby to impart an intermittent rotation to said rollers.

6. In a device of the character described, the combination with two spaced rollers having the ends of an advertising-sheet secured thereto and provided at corresponding ends with a sprocket-wheel, of a sprocket-chain mounted on said wheels and provided at equidistant points with arms, a loose pulley mounted adjacent to each of said sprocket-wheels, driving mechanism including a driven sprocket-wheel, a second sprocket-chain mounted to travel over said loose pulleys and said driven sprocket-wheel and at one side in proximity to one side of said first-named sprocket-chain, and a lug carried by said second-named sprocket-chain and adapted to engage in succession the said arms, whereby to impart an intermittent rotation to said rollers.

7. In a device of the character described, the combination with two spaced rollers having the ends of an advertising-sheet secured thereto, of driving mechanism comprising a driving-shaft, having at opposite ends loose clutch members, a sliding sleeve mounted on said driving-shaft to rotate therewith and adapted to coact at its ends with said clutch members, a screw-threaded shaft mounted parallel to said driving-shaft, oppositely-operating gearing connecting the ends of said screw-threaded shaft with said clutch members, a stop at each end of said sleeve, a pair of pivoted, spring-controlled arms adapted to be thrown into engagement, respectively, with one or the other of said stops, and a traveler mounted on said screw-threaded shaft and adapted to engage said arms, the combination operating as described.

8. In a device of the character described, the combination with two spaced rollers having the ends of an advertising-sheet secured thereto of driving mechanism comprising a driving-shaft having at opposite ends loose clutch members, a sliding sleeve mounted on said driving-shaft to rotate therewith and adapted to coact at its ends with said clutch members, a screw-threaded shaft mounted parallel to said driving-shaft, oppositely-operating gearing connecting the ends of said screw-threaded shaft with said clutch members, a stop at each end of said sleeve, a pair of pivoted arms adapted to be thrown at one end into engagement, respectively, with one or the other of said stops, a link connecting the opposite ends of said arms, a coiled spring connected at one end to said link and at its other to the frame of the device, and a pair of travelers adjustably mounted on said screw-threaded shaft and adapted to engage said arms, the combination operating as described.

In testimony whereof I have hereunto set my hand in presence of two subscribing witnesses.

JOHN D. SMITH.

Witnesses:
TOM C. BRADLEY,
J. ROBINSON.